US012751375B2

(12) United States Patent
Derscheid et al.

(10) Patent No.: US 12,751,375 B2
(45) Date of Patent: Oct. 6, 2026

(54) BALE MOISTURE MEASUREMENT

(71) Applicant: DEERE & COMPANY, Moline, IL (US)

(72) Inventors: Daniel E. Derscheid, Ottumwa, IA (US); Jeremy M. Erdmann, Floris, IA (US)

(73) Assignee: Deere & Company, Moline, IL (US)

( * ) Notice: Subject to any disclaimer, the term of this patent is extended or adjusted under 35 U.S.C. 154(b) by 214 days.

(21) Appl. No.: 18/779,284

(22) Filed: Jul. 22, 2024

(65) Prior Publication Data

US 2026/0020531 A1 Jan. 22, 2026

(51) Int. Cl.
*A01F 15/08* (2006.01)
*B30B 9/30* (2006.01)
*G01N 5/00* (2006.01)

(52) U.S. Cl.
CPC ........ *A01F 15/0825* (2013.01); *B30B 9/3007* (2013.01); *G01N 5/00* (2013.01)

(58) Field of Classification Search
CPC .......... A01F 15/0825; A01F 2015/0891; A01F 15/0833; A01F 15/08; B30B 9/3007; G01N 5/00; G01N 9/02; G01G 19/08
See application file for complete search history.

(56) References Cited

U.S. PATENT DOCUMENTS 10,687,472 B2 6/2020 Derscheid et al.
11,051,456 B2 7/2021 Sloan et al.
11,559,003 B2 1/2023 Ibuki et al.
11,821,778 B1 11/2023 Kuchipudi
2013/0160661 A1* 6/2013 Duenwald .......... A01F 15/0715 100/40
2018/0021796 A1* 1/2018 Roberts .................. G01N 33/02 427/427.2

(Continued)

FOREIGN PATENT DOCUMENTS

CN 117898129 A 4/2024
EP 0978230 B1 1/2003

(Continued)

OTHER PUBLICATIONS

Extended European Search Report and Written Opinion issued in European Patent Application No. 25180068.6 dated Nov. 11, 2025, in 10 pages.

*Primary Examiner* — Jimmy T Nguyen
(74) *Attorney, Agent, or Firm* — Lucian Wayne Beavers; Patterson Intellectual Property Law, PC

(57) ABSTRACT

A baler implement includes a main frame, a baling chamber, a compressing member, a first input assembly, a second input assembly, a weight sensor, and a baler controller. The compressing member compresses the bale within the baling chamber. The first input assembly senses data related to variable dimension of the bale. The second input assembly senses data correlated to a dry matter density of the bale. The weight sensor sense data related to a total weight of the bale in the baling chamber. The baler controller receives the signal indicative of the total weight of the bale from the weight sensor, calculates a moisture weight of the bale based on a numerical difference between the total weight of the bale and a dry matter weight of the bale, and communicates the moisture weight of the bale to a communicator.

10 Claims, 7 Drawing Sheets

(56) References Cited

U.S. PATENT DOCUMENTS

| | | | |
|---|---|---|---|
| 2018/0121467 | A1 | 5/2018 | Derscheid |
| 2024/0122122 | A1 | 4/2024 | Chaney et al. |

FOREIGN PATENT DOCUMENTS

| | | | |
|---|---|---|---|
| EP | 3031317 | B1 | 4/2018 |
| EP | 3461323 | A1 | 4/2019 |
| EP | 3677113 | B1 | 10/2021 |

* cited by examiner

BALE MOISTURE MEASUREMENT

TECHNICAL FIELD

The present disclosure relates generally to a baler implement, and a method of measuring a moisture content of a bale in the baler implement.

BACKGROUND

Proper moisture level in hay crops during baling is critical for preservation during storage. Hay must be dried to a level that prevents mold or microbial growth in the bale during storage. Measuring the moisture of crop material before baling is critical to determining when to start baling and whether to take additional actions to aid in drying the hay. The moisture content of a bale may be sensed and tracked during or after formation for bale management.

SUMMARY

Accordingly to a disclosure, a baler implement includes a main frame, a baling chamber, a compressing member, a first input assembly, a second input assembly, a weight sensor, and a baler controller. The main frame extends along a central longitudinal axis between a forward end and a rearward end relative to a direction of travel. The baling chamber is carried by the main frame and configured for forming a bale therein. The compressing member is configured to compress the bale within the baling chamber. The first input assembly is configured to sense data related to variable dimension of the bale and transmit a signal indicative of the variable dimension. The second input assembly is configured to sense data correlated to a dry matter density of the bale and transmit a signal indicative of the dry matter density of the bale. The weight sensor is configured to sense data related to a total weight of the bale in the baling chamber and to transmit a signal indicative of the total weight of the bale. The baler controller has a processor and a memory having a geometric dimension a bale volume calculation algorithm, a dry bale weight calculation algorithm, and a bale moisture calculation algorithm stored thereon. The processor is operable to execute the bale volume calculation algorithm to receive the signal from the first input assembly and calculate a volume of the bale based on the signal from the first input assembly and a geometric dimension of the baling chamber from the memory. The processor is operable to execute the dry bale weight calculation algorithm to receive the signal from the second input assembly, calculate a dry matter density of the bale based on the signal from the second input assembly, and multiply the volume of the bale by the dry matter density of the bale to obtain a dry matter weight of the bale. The processor is operable to execute bale moisture calculation algorithm to receive the signal indicative of the total weight of the bale from the weight sensor, calculate a moisture weight of the bale based on a numerical difference between the total weight of the bale and the dry matter weight of the bale, and communicate the moisture weight of the bale to a communicator.

In one aspect of the disclosure, the processor is operable to execute bale moisture calculation algorithm to calculate a quotient by dividing the moisture weight of the bale by the total weight of the bale to define a moisture percentage of the bale.

In one aspect of the disclosure, the first input assembly includes a bale size sensor configured to measure a variable dimension of the bale and transmit a signal indicative of the variable dimension of the bale, and the memory is configured to store a geometric dimension of the baling chamber. The processor is operable to execute the bale volume calculation algorithm to receive the signal indicative of the variable dimension of the bale and a signal indicative of the geometric dimension of the baling chamber to calculate the volume of the bale.

In one aspect of the disclosure, the baler implement is a round baler, the geometric dimension of the chamber includes a width of the baling chamber, and the processor is operable to execute the bale volume calculation algorithm to calculate the volume of the bale by multiplying the width of the baling chamber by a circular end area of the bale. The circular end area is equal to Pi multiplied by the square of the radius of the bale.

In one aspect of the disclosure, the baler implement is a square baler, the geometric dimension of the baling chamber includes a width and a height of the baling chamber, and the processor is operable to execute the bale volume calculation algorithm to calculate the volume of the bale including multiplying the width of the baling chamber by the height of the baling chamber by the length of the bale.

In one aspect of the disclosure, the second input assembly includes a force sensor configured to measure a force acting on the compressing member of the baler implement compressing the bale within the baling chamber. The dry matter density of the bale is derived based on a correlation between the force acting on the compressing member and dry matter density.

In one aspect of the disclosure, the implement baler is a round baler, and the compressing member includes a tension cylinder. The force acting on the compressing member includes a fluid pressure force of the tension cylinder.

In one aspect of the disclosure, the baler implement is a square baler, and the compressing member includes a plunger. The force acting on the compressing member includes a pressure force acting on a face of the plunger.

In one aspect of the disclosure, the processor is operable to execute the dry bale weight calculation algorithm to calibrate the calculation of the dry matter density of the bale based on at least one of a crop type, a crop length, a crop stem diameter, an ash content of crop, a bale shape, a rate of bale growth, a stem conditioning factor, a friction between the bale and the baling chamber, or a drive torque creating drive induced tension in a baler belt.

Accordingly to a disclosure, a method of measuring a moisture content of a bale in a baling chamber of a baler implement comprising: calculating a volume of the bale in the baling chamber with a baler controller, calculating a dry matter density of the bale with the baler controller, multiplying the volume of the bale by the dry matter density of the bale with the baler controller to obtain a dry matter weight of the bale, measuring a total weight of the bale in the baling chamber with a weight sensor of the baler implement, calculating a numerical difference between the total weight of the bale and the dry matter weight of the bale with the baler controller to determine a moisture weight of the bale, and communicating a signal including the moisture weight of the bale with the baler controller.

In one aspect of the disclosure, the method further includes calculating a quotient by dividing the moisture weight of the bale by the total weight of the bale to define a moisture percentage of the bale.

In one aspect of the disclosure, the method further includes receiving a geometric dimension of the baling chamber from a memory of the baler controller and measuring at least one variable dimension of the bale in the baling chamber with a bale size sensor. Calculating the volume of the bale is further defined as calculating the volume of the bale based on the geometric dimension of the baling chamber and the at least one variable dimension of the bale.

In one aspect of the disclosure, the at least one variable dimension includes one of a diameter of the bale, a radius of the bale, or a length of the bale.

In one aspect of the disclosure, the baler implement is a round baler, and the geometric dimension of the baling chamber includes a width of the baling chamber. Calculating the volume of the bale includes multiplying the width of the baling chamber by a circular end area of the bale. The circular end area is equal to Pi multiplied by the square of the radius of the bale.

In one aspect of the disclosure, the baler implement is a square baler, and the geometric dimension of the baling chamber includes a width and a height of the baling chamber. Calculating the volume of the bale includes multiplying the width of the baling chamber by the height of the baling chamber by the length of the bale.

In one aspect of the disclosure, the method further includes measuring a force acting on a compressing member of the baler implement compressing the bale within the baling chamber with a force sensor. The dry matter density of the bale is derived based on a correlation between the force acting on the compressing member and dry matter density.

In one aspect of the disclosure, the baler implement is a round baler, and the compressing member includes a tension cylinder. The force acting on the compressing member includes a fluid pressure force of the tension cylinder.

In one aspect of the disclosure, the baler implement is a square baler, and the compressing member includes a plunger. The force acting on the compressing member includes a pressure force acting on a face of the plunger.

In one aspect of the disclosure, calibrating the calculation of the dry matter density of the bale is based on at least one of a crop type, a crop length, a crop stem diameter, an ash content of crop, a bale shape, a rate of bale growth, a stem conditioning factor, a friction between the bale and the baling chamber, and a drive torque creating drive induced tension in a baler belt.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1A:
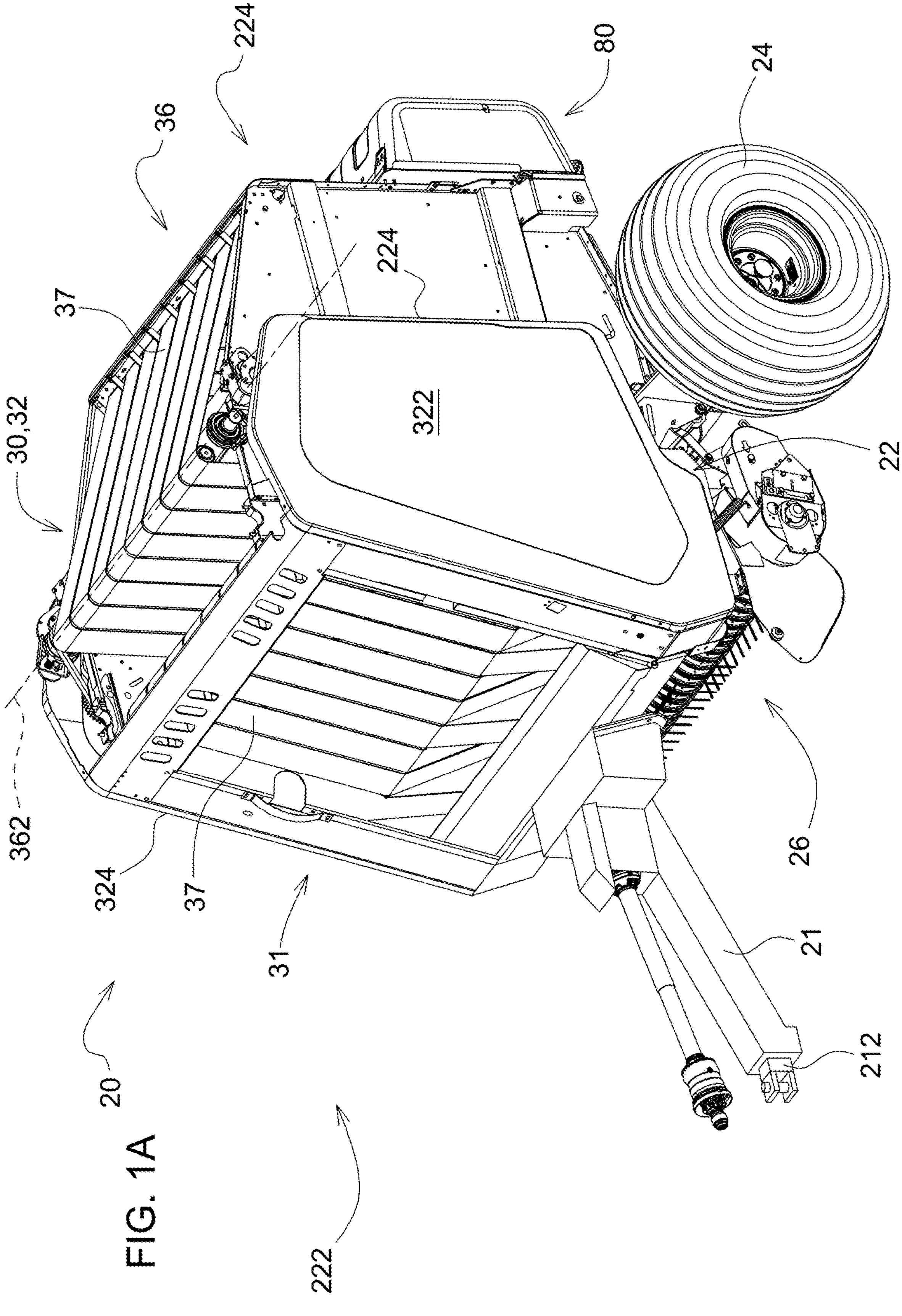
FIG. 1A is a schematic perspective view of a baler implement, which is a round baler.
Figure 1B:
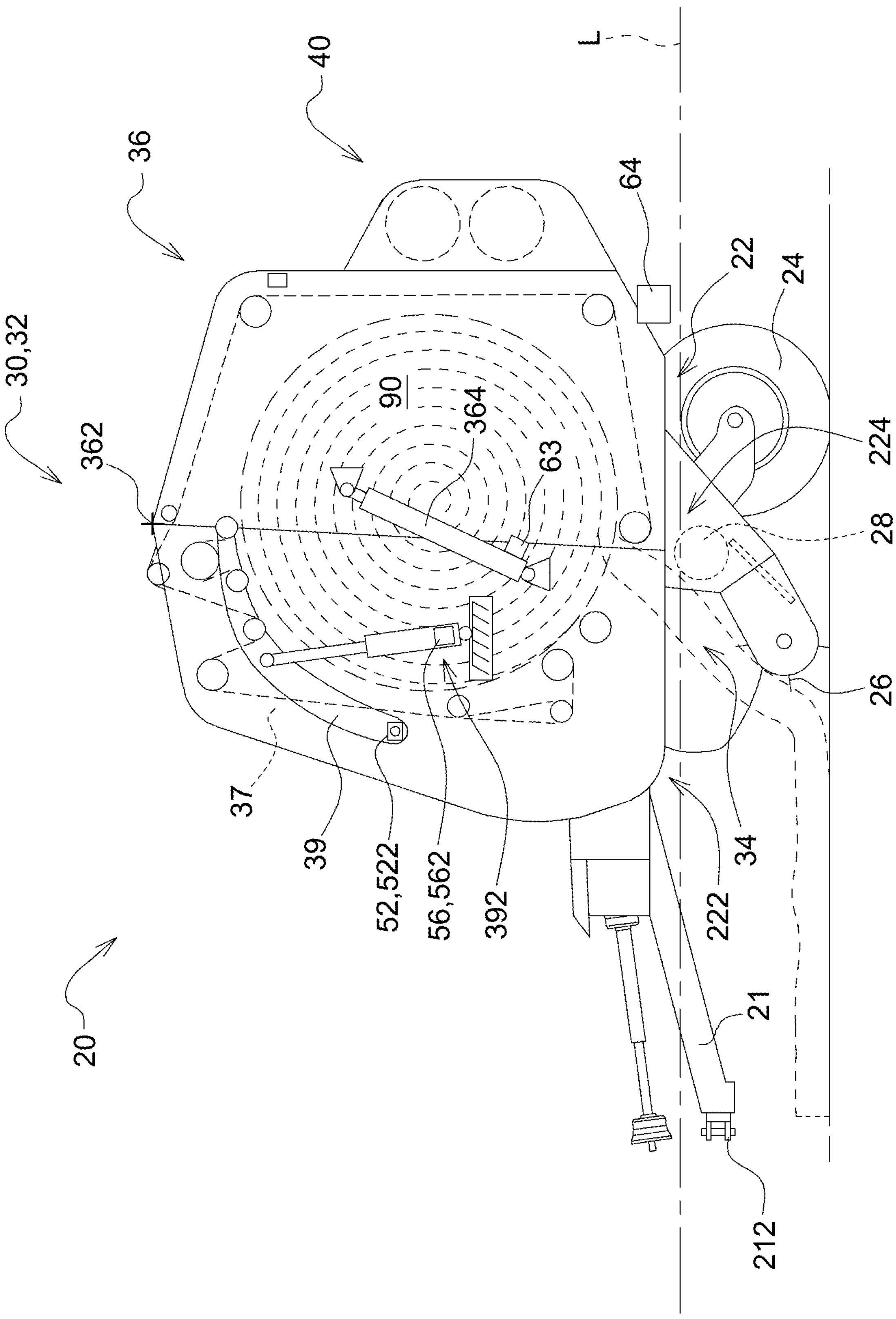
FIG. 1B is a schematic side view of the baler implement of FIG. 1A.
Figure 1C:
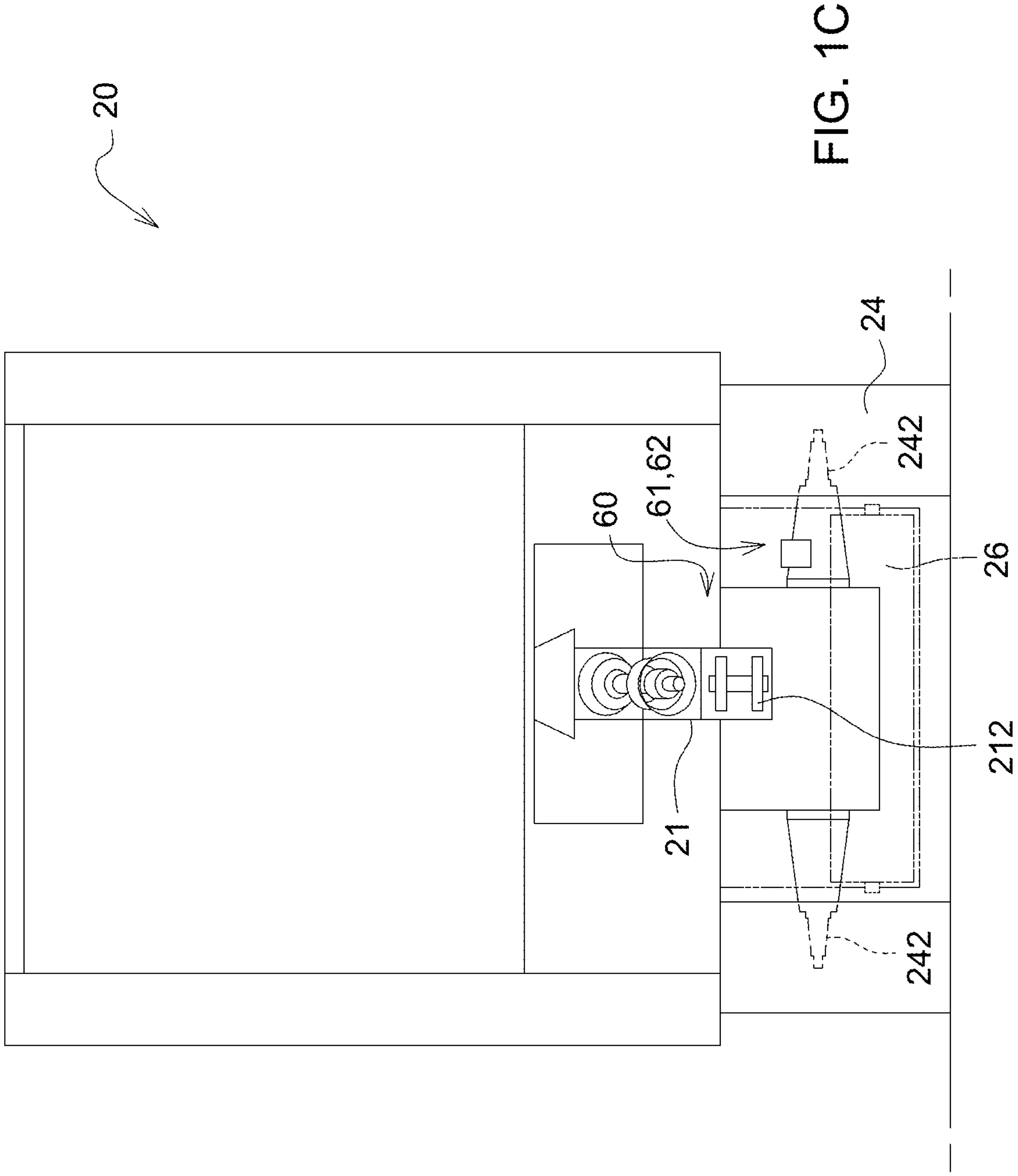
FIG. 1C is a front view of the baler implement of FIG. 1A.

Referring to FIGS. 1A-1C, a baler implement 20 is generally shown. The baler implement 20 in this implementation is a round baler with a variable baling chamber; in another implementation, the baler implement 20 can be a round baler with a fixed baling chamber. The baler implement 20 includes a main frame 22. The main frame 22 extends along a longitudinal axis L between a forward end 222 and a rearward end 224 relative to a direction of travel. One or more ground engaging apparatus 24, such as but not limited to one or more wheels and/or tracks, are attached to and rotatably supported by the main frame 22. The baler implement 20 may include an axle having spindles 242, as shown in FIG. 1C, respectively coupled between the main frame 22 and the wheels (or tracks). The spindles 242 may deflect in response to the weight of the bale 90. A tongue 21 may be coupled to the main frame 22 at a forward end 222 of the main frame 22. A hitch arrangement 212 may be included with the tongue 21. The hitch arrangement 212 may be used to attach the baler implement 20 to a traction unit (not shown), such as but not limited to an agricultural tractor. In other embodiments, the baler implement 20 may be self-propelled, in which case the traction unit and the baler implement 20 are configured as a single, self-propelled vehicle.

The baler implement 20 includes a baling system 30 having a housing 31 forming a baling chamber 32. The housing 31 is attached to and supported by the main frame 22. The housing 31 may include one or more walls or panels that at least partially enclose and/or define the baling chamber 32. The baling chamber 32 has a first lateral side 322 and a second lateral side 324, as parts of the inner portion of the housing 31, which define the width of the baling chamber 32 in the lateral direction. The width of the baling chamber 32 may be stored in a memory of a baler controller, which will be discussed later. The baler implement 20 further includes a gate 36. The gate 36 is attached to and rotatably supported by the housing 31. The gate 36 is positioned adjacent a rearward end 224 of the main frame 22 and is pivotably moveable about a gate axis 362. The gate axis 362 is generally horizontal and perpendicular to the central longitudinal axis 226 of the main frame 22. The gate 36 is moveable between a closed position for forming a bale 90 within the baling chamber 32, and an open position for discharging the bale 90 from the baling chamber 32.

The baler implement 20 includes a pick-up 26 disposed proximate the forward end 222 of the main frame 22. The pick-up 26 gathers crop material from a ground surface and directs the gathered crop material toward and into an inlet 34 of the baling chamber 32. The pick-up 26 moves crop material along a crop path relative to the main frame 22. The pick-up 26 may include, but is not limited to tines, forks, augers, conveyors, baffles, etc., for gathering and moving the crop material. The baler implement 20 may be equipped with a pre-cutter 28, disposed between the pick-up 26 and the inlet 34. As such, the pre-cutter 28 is disposed downstream of the pick-up 26 and upstream of the inlet 34 relative to a direction of travel of the crop material. The pre-cutter 28 cuts or chops the crop material into smaller pieces.

The baler implement 20 may be configured as a variable chamber baler, or as a fixed chamber baler. The baler implement 20 shown in the FIGS. 1 and 2 and described herein is depicted and described as a variable chamber baler.

As is understood by those skilled in the art, the variable chamber baler includes a plurality of longitudinally extending side-by-side forming belts 37 that are supported by a plurality of rollers 38. The bale 90 is formed by the forming belts 37 and one or more side walls of the housing 31.

The crop material is directed through the inlet 34 and into the baling chamber 32, whereby the forming belts 37 roll the crop material in a spiral fashion into the bale 90 having a cylindrical shape. The forming belts 37 apply a constant pressure to the crop material as the crop material is formed into the bale 90. A belt tensioner 39 continuously moves the forming belts 37 radially outward relative to a center of the cylindrical bale 90 as the diameter (or radius) of the bale 90 increases. The belt tensioner 39 maintains the appropriate tension in the belts 37 to obtain the desired density of the crop material. The belt tensioner 39 may include or is coupled to a tension cylinder 392, which can move or pivot the belt tensioner 39 to determine the compressing force against the bale 90. A force sensor 562 is coupled to the tension cylinder 392 and is used to measure the hydraulic pressure, for example, and to transmit signal indicative of the compressing force to the baler controller 70.

The baler implement 20 includes a wrap system 40. The wrap system 40 is operable to wrap the bale 90 with a wrap material inside the baling chamber 32. Once the bale 90 is formed to a desired size, the wrap system 40 feeds the wrap material into the baling chamber 32 to wrap the bale 90 and thereby secure the crop material in a tight package and maintain the desired shape of the bale 90. The wrap material may include, but is not limited to, a twine, a net mesh, or a solid plastic wrap. Movement of the gate into the open position simultaneously moves the belts clear of the formed bale 90 and allows the formed and wrapped bale to be discharged through the rear of the baling chamber 32.

The baler implement 20 may include various on-board bale size sensors 52 to measure the size of the bale 90. Take a bale diameter sensor for example. The position of the tensioning device 39, at any given time, is an indication of the size of the bale 90 at that time. The bale diameter sensor 522 in the form of a potentiometer may be affixed to the pivot point of the tensioning device 39 and thus provides an electrical signal indicative of bale diameter (or radius) to the controller 70. The controller 70 can determine the bale volume, which is discussed later. Other bale size sensor 52, including but not limited to optical sensor, may capture the image of the bale and transmit a signal for the controller 70 to analyze the size of the bale 90. The baler implement 20 may include a weight sensor 60 to measure the weight of the bale 90. For example, the weight sensor 60 may include one and more load cells 61 applied on the spindles 242 and/or the hitch arrangement 212 and measure the strain in response to the bale weight. The controller 70 receives the signal from the load cell 61, which is indicative of the total wight of the bale 90 and calculates the weight of the bale 90. In another example, the weight sensor 60 includes one and more distance sensors 62 described in the U.S. Pat. No. 10,687,472 B2. The distance sensors 62 may be applied to an axle housing or spindle housings and measure the distance between the distance sensor 62 and the axle or spindles 242. In addition, the distance sensor 62 may be applied to a hitch housing and measure the distance between a component of the hitch arrangement 212 and the distance sensor 62. The signals from the distances sensors 62 indicative of total weight of the bale 90 and the controller 70 can calculate the total weight of the bale 90 based on the signals. In another example, the weight sensor 60 may include hydraulic pressure sensors 63 coupled to actuators 364 (FIG. 1B) that pivot the gate 36. Shortly before the bale 90 is released, the gate 36 is partially open and the bale 90 may be suspended by the gate 36, which increases the hydraulic pressure of the actuators 364. With the measurement sensed by the hydraulic pressure sensors 63, which transmit signals indicative of total weight of the bale 90, the controller 70 can calculate the total weight of the bale 90. The hydraulic pressure sensors 63 may be a type of force detector described in the U.S. Pat. No. 11,051,456B2. The disclosure of U.S. Pat. No. 11,051,456B2 is incorporated herein. In another example, the weight sensor 60 may include platform scale 64, which is positioned on an accumulator, a ramp, a wrapping table, or other component of the baler implement 20, configured to measure the total weight of the bale 90 and to transmit signals indicative of total weight of the bale 90 to the controller 70.

Figure 2:
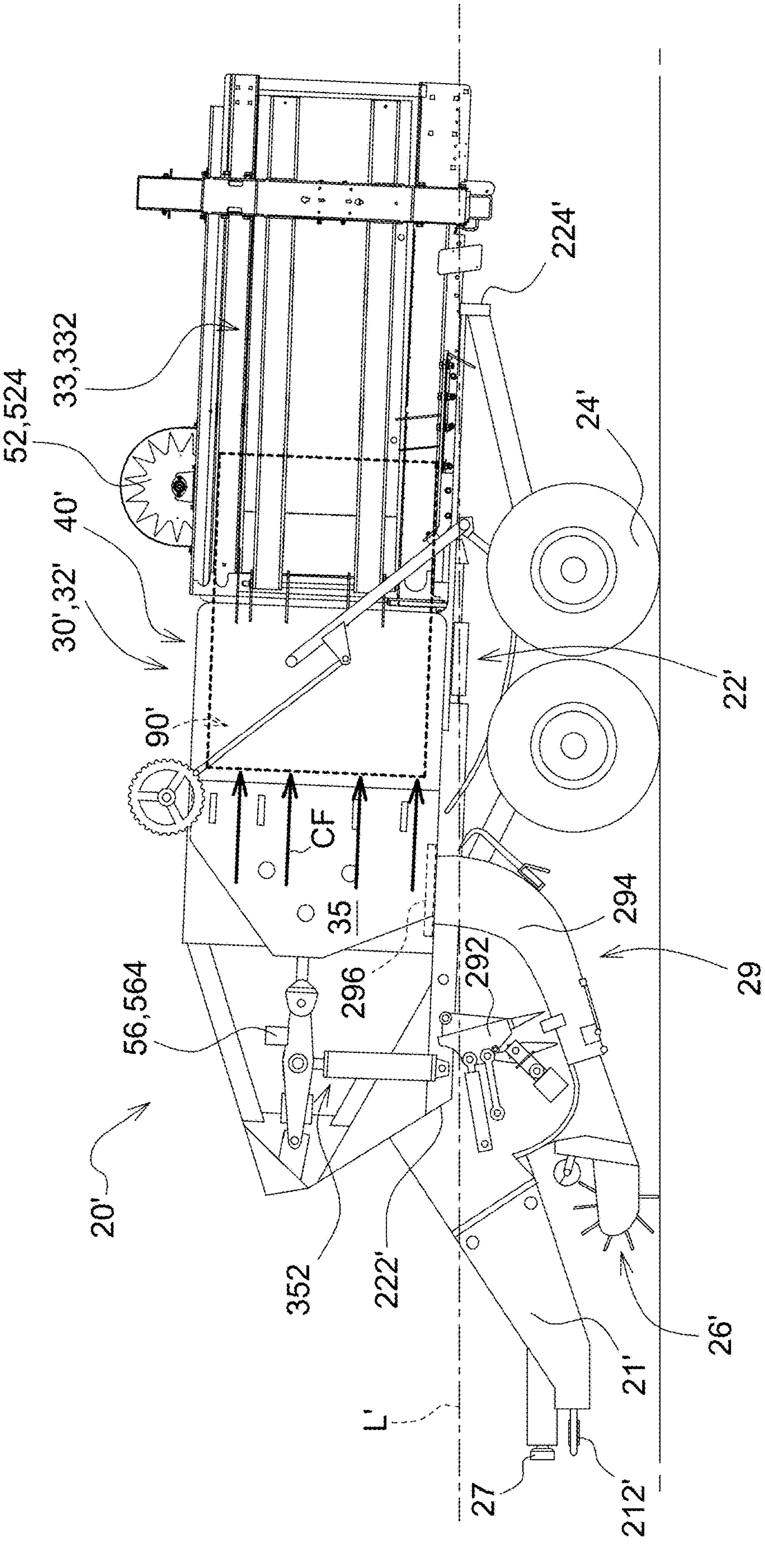
FIG. 2 is a schematic side view of a baler implement, which is a square baler.

FIG. 2 illustrates another implementation of the baler implement 20', configured as a square baler. Although a large square baler is shown, this disclosure also applies to other balers and harvesting machines. The baler implement 20' may be coupled to an agricultural vehicle (not shown), such as a tractor, with the tongue 21'. However, the baler implement 20' may be a self-propelled machine or coupled to another harvesting machine.

The baler implement 20' includes a frame 22', a ground engaging apparatus 24', a pick-up system 26', and an input shaft 27. The frame 22' includes a longitudinal axis L' that extends between a forward end 222' and a rearward end 224' of the frame 22' and relative to the direction of travel of the baler implement 20' during operation. The ground engaging apparatus 24' is coupled to the frame 22' and supports the baler implement 20' to travel on the ground surface. The ground engaging apparatus 24' may include wheels, as shown in FIG. 2. However, in another implementation, the ground engaging apparatus 24 is tracked to operate in a rough soil condition. The baler implement 20' may include axle having spindles or an axle (not shown) respectively coupled between the main frame 22' and the wheel. The spindles may deflect in response to the weight of the bale. The tongue 21' may be coupled to the main frame 22' at a forward end 222' of the main frame 22'. A hitch arrangement 212' may be included with the tongue 21'. The input shaft 27, such as a power-take-off (PTO) shaft, which can receive rotational power from the agricultural vehicle like tractor or other power sources. The input shaft 27 may connect to an input of the gear train or transmission providing rotational power to the baler implement 20', and a portion of the rotational power may be used to drive a plunger 35, which will be described later. The pick-up system 26' gathers the cut crop, which is a crop material lying on the ground. The pick-up system 26' including, but not limited to, tines, forks, augers, conveyors, baffles, a cutter or pre-cutter assembly, or any combination of the preceding. The pick-up system 26' moves the cut crop upward to a feed system 29 of the baler implement 20'.

The baler implement 20' also includes the feed system 29, baling system 30', and a wrap system 40'. The baling system 30' includes a baling chamber 32' (compressing chamber) and the plunger 35. The pick-up system 26' is followed by the feed system 29. The feed system 29 includes feeder forks 292 and a pre-compression chamber 294 (pre-compression channel). The feeder forks 292 illustrated in FIG. 2 are for explanatory purpose; other configuration of protrusions, such as tines, which are operable to be inserted or extended into the pre-compression chamber 294 and swingable or moveable to move the crop material along the pre-compression chamber 294 may have the similar function as the feeder forks 292. The pre-compression chamber 294 is used to temporally store a volume of the crop material (cut crop). The pick-up system 26' directs the cut crop to an inlet of the pre-compression chamber 294. The cut crop builds up within the pre-compression chamber 294 with the pick-up system 26' moving the cut crop to the pre-compression chamber 294. When the crop material accumulates to a fill condition, which may be pre-determined, a door 296 (or inlet of the compression chamber 32) between the pre-compression chamber 294 and the compression chamber 32 is open, and the feeder forks 292 swing to push the crop material into the bailing chamber 32'.

The plunger 35 is operable to reciprocate within the baling chamber 32' to provide a compressive force CF to compress crop material in the baling chamber 32' into a flake against a plurality of other flakes of a currently forming bale 90' and to move the currently forming bale 90' through the baling chamber 32'. The plunger 35 reciprocates within the baling chamber 32' between a first position (shortest retract position) and a second position (longest extension position) via a crank assembly 352. When the plunger 35 is back to the first position, the door 296, as mentioned above previously, opens and the crop material is brought into the baling chamber 32'. When the plunger 35 is driven toward the second position, the plunger 35 may compress the crop through panels 33 of the baling chamber 32'. The panels 33 may define the height and width of the bale 90'. Some panels 33 (e.g., tension panel 332) of the baling chamber 32' are moveable by actuators (not shown) and generates more friction between the currently forming bale 90' being pushed out of the baler implement 20 and the panels 33. Tension panels 564 pressing against the crop material in the baling chamber 32' is to maintain a consistency in bale density.

A controller 70 (FIG. 3) may also control the actuator (e.g., an input of the gear train or transmission) of the plunger 35, through the algorithms, to adjust the compressive force CF of the plunger 35. A force sensor 564 is coupled to a portion of the plunger 35 and is operable to measure a characteristic of a portion of the plunger 35 and to transmit a signal indicative of the characteristic of the portion of the plunger 35. This this implementation, the force sensor 564 may be positioned on the crank assembly 352 of the plunger 35 but the force sensor 564 could be mounted on any other portion of the plunger 35 to detect the characteristic of the plunger 35. The force sensor 564 may include a load cell sensor that coverts an input mechanical force such as compression, torque, pressure, or other characteristic on the crank assembly 352 to an electric output signal (the signal indicative of the characteristic of the portion of the plunger 35) that is received by the controller 70. The input mechanical force is generated from the reaction from the currently forming bale 90', when the compressive force CF is applied to the currently forming bale 90'.

Regarding measuring the size of the bale 90', the baler implement 20' also includes as discussed above, a bale size sensor 52, which may include a measuring wheel 524 in this case. The height and width of the bale 90' may be determined by the geometric dimension of the baling chamber 32'. As to the length of the bale 90', the measuring wheel 524 is used to measure the length. The measuring wheel 524 has teeth around its periphery, which pierce into the forming bale (hay) during rotation of the measuring wheel 524. As the forming bale moves, driven by the plunger 35, the measuring wheel 524 rotates. The measuring wheel 524 transmits signal indicative of the bale length to the controller 70. When the bale length reach a threshold, the controller 70 will transmit a control signal to a wrap system 40' (e.g., knotter) to encircle the currently forming bale 90' with a twine to form a completed bale. The controller 70 can use signal from the measuring wheel 524 and other information to calculate the volume of the bale 90'. Regarding measuring the weight of the bale 90', the baler implement 20' may include various weight sensors to measure the weight of the bale 90', like the examples described for the round baler. For example, the weight sensor 60 includes one and more load cells applied on the spindles and/or the hitch arrangement 212' of the baler implement 20', the distance sensors may be applied to an axle housing (or spindle housings) and/or a hitch housing, a platform scale, which is positioned on an accumulator, a ramp, wrapping table, or other component of the baler implement 20'. The weigh sensor 60 of the baler implement 20' is configured to measure the total weight of the bale 90' and to transmit signals indicative of total weight of the bale 90' to the controller 70.

Figure 3:
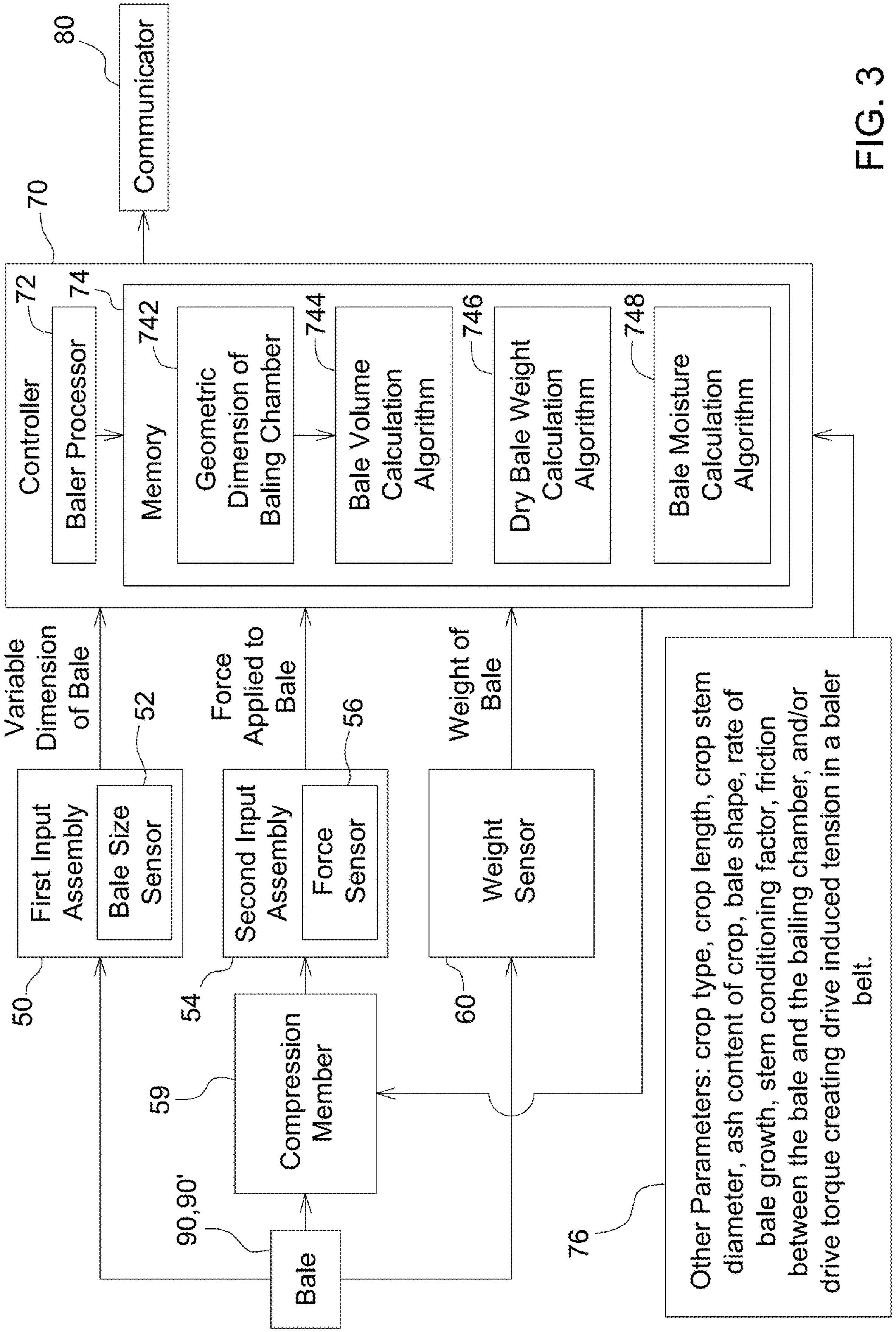
FIG. 3 is a block diagram of a bale moisture measurement system.

Referring to FIG. 3, a system measuring the moisture of the bale includes a first input assembly 50, a second input assembly 54, a compression member 59, a weight sensor 60, the controller 70, and a communicator 80. This system could be applied to baler implement 20 (i.e., round baler) or baler implement 20' (square baler).

The controller 70 is disposed in communication with the first input assembly 50, the second input assembly 54, the weight sensor 60, the compression member 59, and the communicator 80. The controller 70 is operable to receive signals from the first input assembly 50, the second input assembly 54, and the weight sensor 60, and communicate signals to the compression member 59, and the communicator 80. While the controller 70 is generally described herein as a singular device, it should be appreciated that the controller 70 may include multiple devices linked together to share and/or communicate information therebetween. Furthermore, it should be appreciated that the controller 70 may be located on the baler implement 20, 20' or located remotely from the baler implement 20, 20'.

The controller 70 may alternatively be referred to as a computing device, a computer, a control unit, a control module, a module, etc. The controller 70 includes a processor 72, a memory 74, and all software, hardware, algorithms, connections, sensors, etc., necessary to manage and control the operation of the first input assembly 50, the second input assembly 54, the weight sensor 60, the compression member 59, and the communicator 80. As such, a method may be embodied as a program or algorithm operable on the controller 70. It should be appreciated that the controller 70 may include any device capable of analyzing data from various sensors, comparing data, making decisions, and executing the required tasks.

As used herein, "controller 70" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 70 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 70 may be in communication with other components on the baler implement 20, 20', such as hydraulic components, electrical components, and operator inputs within an operator station of an associated work vehicle. The controller 70 may be electrically connected to these other components by a wiring harness such that messages, commands, and electrical power may be transmitted between the controller 70 and the other components. Although the controller 70 is referenced in the singular, in alternative embodiments the configuration and functionality described herein can be split across multiple devices using techniques known to a person of ordinary skill in the art.

The controller 70 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 70 includes the tangible, non-transitory memory 74 on which are recorded computer-executable instructions, including a bale volume calculation algorithm 744, a dry bale weight calculation algorithm 746, and a bale moisture calculation algorithm 748. The bale processor 72 of the controller 70 is configured for executing the bale volume calculation algorithm 744, the dry bale weight calculation algorithm 746, and the bale moisture calculation algorithm 748. The bale volume calculation algorithm 744 implements a method of calculating the volume of the bale, the dry bale weight calculation algorithm 746 implements a method of obtaining a dry matter weight of the bale, the bale moisture calculation algorithm 748 implements a method of calculating the moisture weight (or moisture percentage) of the bale described in detail below.

The first input assembly 50 is configured to sense data related to variable dimension of the bale 90 or 90' and transmit a signal indicative of the variable dimension. The first input assembly 50 may include a bale size sensor 52 configured to measure a variable dimension of the bale 90 or 90' and transmit a signal indicative of the variable dimension of the bale 90 or 90'. The memory 74 is configured to store a geometric dimension 742 of the baling chamber 32 or 32'. The processor 72 is operable to execute the bale volume calculation algorithm 744 to receive the signal indicative of the variable dimension from the first input assembly 50 and calculate a volume of the bale 90 or 90' based on the signal from the first input assembly 50. For example, the processor 72 is operable to execute the bale volume calculation algorithm 744 to receive the signal indicative of the variable dimension of the bale 90 or 90' and the geometric dimension of the baling chamber 32 or 32' from the memory 74 to calculate the volume of the bale 90 or 90'. When the baler implement 20 is a round baler, the bale size sensor 52 may be the bale diameter sensor 522 to measure the variable dimension, which is the diameter (or radius) of the bale 90. The geometric dimension of the chamber 32 includes a width of the baling chamber 32, and the processor 72 is operable to execute the bale volume calculation algorithm 744 to calculate the volume of the bale 90 including multiplying the width of the chamber 32 by a circular end area of the bale 90 (like the cross-sectional area of the bale 90 shown in FIG. 1B). The circular end area is equal to Pi multiplied by the square of the radius of the bale 90. When the baler implement 20' is a square baler, the bale size sensor 52 may be the measuring wheel 524 to measure the variable dimension, which is the length of the bale 90'. The geometric dimension of the baling chamber 32' includes a width and a height of the baling chamber 32'. The processor 72 is operable to execute the bale volume calculation algorithm 744 to calculate the volume of the bale 90' including multiplying the width of the baling chamber 32' by the height of the baling chamber 32' by the length of the bale 90'. Optionally, the actuators that compress the tension panel 332 are coupled to sensors that may measure the displacement of the actuators or hydraulic pressure of the actuators. The sensors may transmit signals to the controller to adjust the calculation of the volume of the bale 90'.

The compressing member 59 is configured to compress the bale within the baling chamber 32 or 32'. The second input assembly 55 configured to sense data correlated to a dry matter density of the bale 90 or 90' and transmit a signal indicative of the dry matter density of the bale. The second input assembly 55 includes a force sensor 56 configured to measure a force acting on the compressing member 59 of the baler implement 20 or 20' compressing the bale 90 or 90' within the baling chamber 32 or 32'. The dry matter density of the bale 90 or 90' is derived based on a correlation between the force acting on the compressing member 59 and dry matter density. When the implement baler 20 is the round baler, the compressing member 59 may include the belt tensioner 39 and/or the tension cylinder 392. The force acting on the belt tensioner 39 is measured by the force sensor 562 (e.g., a strain sensor). Alternatively, the force acting on the belt tensioner 39 can be represented by a fluid pressure force of the tension cylinder 392, which is measured by the force sensor 562 (e.g., hydraulic pressure sensor). When the baler implement 20' is the square baler, the compressing member 59 may include the plunger 35. The force acting on the compressing member 59 includes a pressure force acting on a face of the plunger 35. The pressure force may be measured by the force sensor 564 or another sensor.

Figure 4:
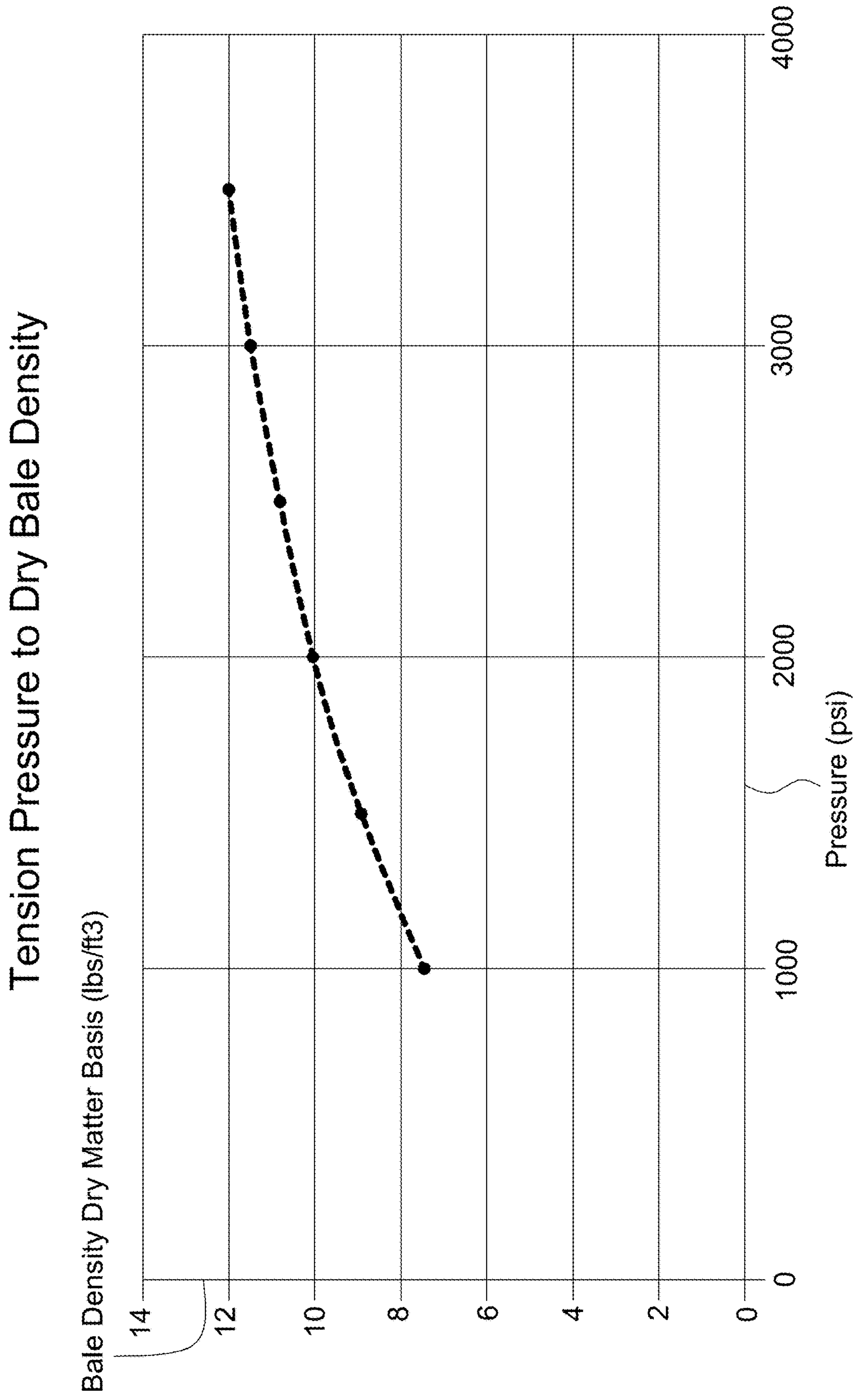
FIG. 4 is a correlation diagram illustrating the relationship between the pressure applied to a bale and drive matter density of the bale.

After the measurement of the force sensor 56 (e.g., force sensor 562 or force sensor 564), the processor 70 executes the dry bale weight calculation algorithm 746 to receive the signal from the second input assembly 55, calculates a dry matter density of the bale 90 or 90' based on the signal from the second input assembly 55, and multiplies the volume of the bale 90 or 90' by the dry matter density of the bale to obtain a dry matter weight of the bale 90 or 90'. The density on a dry matter basis may be determined empirically for a given baler implement 20 or 20' across the various density settings. Take round baler for example. FIG. 4 illustrates a chart regarding the relationship between the hydraulic pressure of the tension cylinder 392 and the bale density dry matter basis (i.e., dry matter density of the bale 90). By receiving signal indicative of the tension pressure to the bale 90, the processor 72 can calculate a dry matter density of the bale 90 (i.e., the density of the bale 90 if it is completely dry without moisture). Likewise, in square baler case, there is also a correlation between the force and dry matter density of the bale 90' and the processor 72 can calculate a dry matter density of the bale 90'.

Optionally, the processor 72 is operable to execute the dry bale weight calculation algorithm 746 to calibrate the calculation of the dry matter density of the bale 90 or 90' based on at least one of a crop type, a crop length, a crop stem diameter, an ash content of crop, a bale shape, a rate of bale growth, a stem conditioning factor, a friction between the bale 90 or 90' and the baling chamber 32 or 32', and a drive torque creating drive induced tension in a baler belt (collectively referred to as other parameters 76). It is noted that the friction between the bale and the baling chamber 32' may be determined by the tension panel 332.

The weight sensor 60 configured to sense data related to a total weight of the bale 90 or 90' in the baling chamber 32 or 32' and to transmit a signal indicative of the total weight of the bale 90 or 90'. As discussed, when the baler implement 20 is the round baler, the weight sensor 60 may be the load cell 61, the deflection sensor 62, the hydraulic pressure sensor 63, the platform scale 64, or other types of sensor that directly or indirectly measure the weight of the bale 90. Similarly, when the baler implement 20' is the square baler, the weight sensor 60 may be the load cell, the deflection sensor, the platform scale, or other types of sensor that directly or indirectly measure the weight of the bale 90'.

The processor 72 then executes bale moisture calculation algorithm 748 to receive the signal indicative of the total weight of the bale 90 or 90' from the weight sensor 60 and calculate a moisture weight of the bale 90 or 90' based on a numerical difference between the total weight of the bale 90 or 90' and the dry matter weight of the bale 90 or 90'. The processor 72 also executes bale moisture calculation algorithm 748 to calculate a quotient by dividing the moisture weight of the bale 90 or 90' by the total weight of the bale 90 or 90' to define a moisture percentage of the bale 90 or 90'. The processor 72 communicates the moisture weight and/or the moisture of percentage of the bale 90 or 90' on the communicator 80, which may include a display, speaker, or other input or output devices. The processor 72 may also adjust the force of the compression member 59 based on the moisture weight and/or the moisture of percentage of the bale 90 or 90'. Further, the controller 70 may be also connected to other outputs, such as a spray nozzle. The processor 72 may execute an algorithm to control the spray of a preservative based on the moisture weight and/or moisture of the bale 90 or 90'. If the bale 90 or 90' is wetter, more preservative would be applied.

Figure 5:
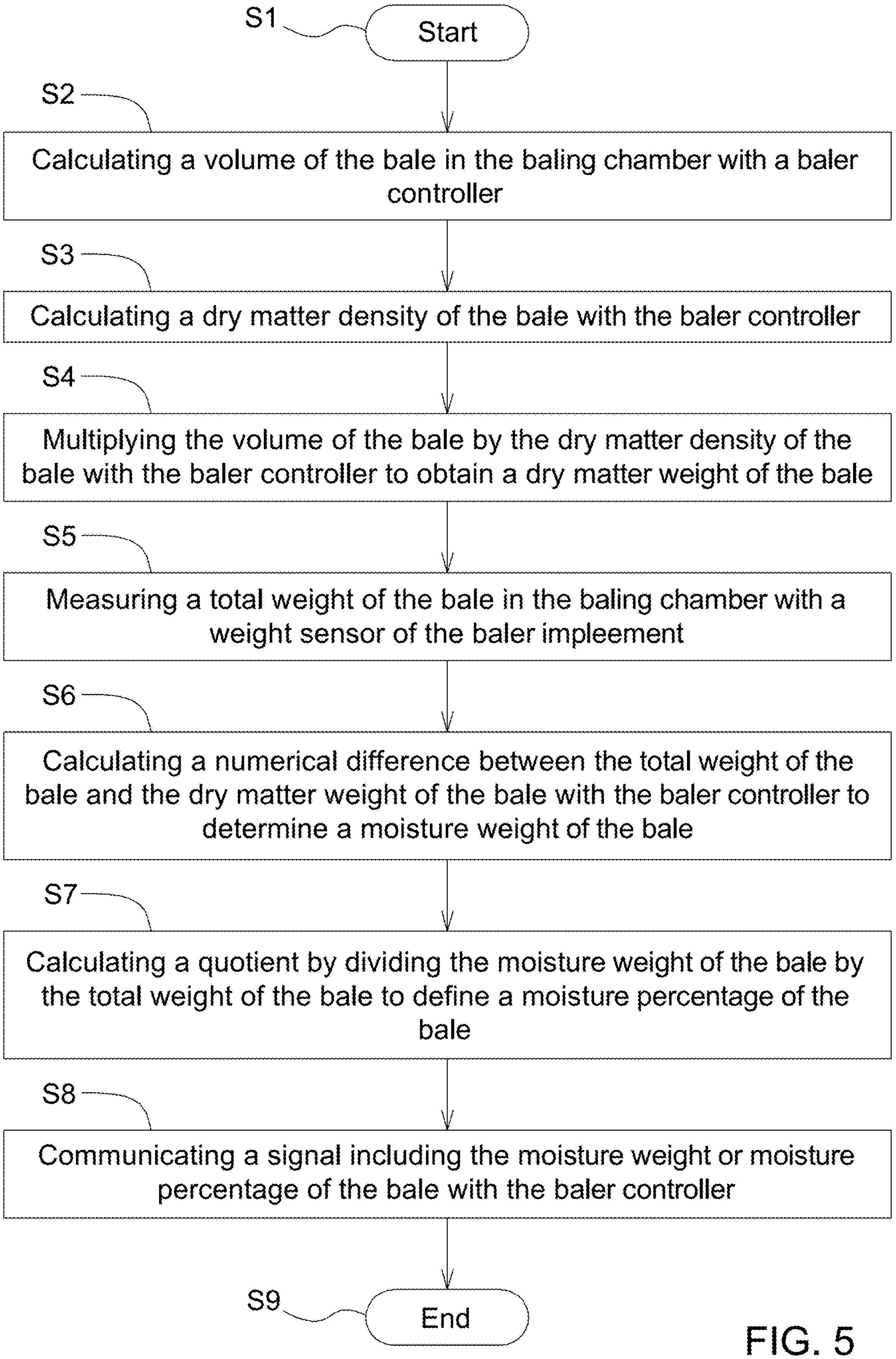
FIG. 5 is a flowchart for a method of bale moisture measurement.

FIG. 5 demonstrates a flowchart for a method of bale moisture measurement, which applies to baler implement 20 or 20'.

S1: Start.

S2: Calculating a volume of the bale in the baling chamber with a baler controller. Calculating the volume of the bale is further defined as calculating the volume of the bale based on a geometric dimension of the baling chamber and at least one variable dimension of the bale. The geometric dimension of the baling chamber, for example, is received from a memory of the baler controller. The least one variable dimension of the bale in the baling chamber is measured with a bale size sensor. The at least one variable dimension includes one of a diameter of the bale, a radius of the bale, or a length of the bale, depending on what type of the baler implement. When the baler implement is a round baler, the geometric dimension of the baling chamber includes a width of the baling chamber. Calculating the volume of the bale includes multiplying the width of the baling chamber by a circular end area of the bale. The circular end area is equal to Pi multiplied by the square of the radius of the bale. When the baler implement is a square baler, the geometric dimension of the baling chamber includes a width and a height of the baling chamber. Calculating the volume of the bale includes multiplying the width of the baling chamber by the height of the baling chamber by the length of the bale.

S3: Calculating a dry matter density of the bale with the baler controller. The dry matter density of the bale is derived based on a correlation between a force acting on a compressing member and dry matter density. For such calculation, the method may include measuring the force acting on the compressing member of the baler implement compressing the bale within the baling chamber with a force sensor. When the baler implement is the round baler, the compressing member includes, for example, a tension cylinder. The force acting on the compressing member includes a fluid pressure force of the tension cylinder. When the baler implement is a square baler, the compressing member includes a plunger. The force acting on the compressing member includes a pressure force acting on a face of the plunger. Optionally, calculating a dry matter density of the bale with the baler controller includes calibrating the calculation of the dry matter density of the bale based on at least one of a crop type, a crop length, a crop stem diameter, an ash content of crop, a bale shape, a rate of bale growth, a stem conditioning factor, a friction between the bale and the baling chamber, and a drive torque creating drive induced tension in a baler belt.

S4: Multiplying the volume of the bale by the dry matter density of the bale with the baler controller to obtain a dry matter weight of the bale.

S5: Measuring a total weight of the bale in the baling chamber with a weight sensor of the baler implement.

S6: Calculating a numerical difference between the total weight of the bale and the dry matter weight of the bale with the baler controller to determine a moisture weight of the bale.

S7: Calculating a quotient by dividing the moisture weight of the bale by the total weight of the bale to define a moisture percentage of the bale.

S8: Communicating a signal including the moisture weight of the bale with the baler controller.

S9: End

Without in any way limiting the scope, interpretation, or application of the claims appearing below, a technical effect of one or more of the example embodiments disclosed herein is to measure entire bale moisture during the baling process. As such, this would help the operator to determine when to start another baling, whether to take additional actions, such as raking the hay, to aid drying, and how much preservative required to be applied on the bale.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler implement comprising:

a main frame extending along a central longitudinal axis between a forward end and a rearward end relative to a direction of travel;

a baling chamber carried by the main frame and configured for forming a bale therein;

a compressing member configured to compress the bale within the baling chamber;

a first input assembly configured to sense data related to variable dimension of the bale and transmit a signal indicative of the variable dimension;

a second input assembly configured to sense data correlated to a dry matter density of the bale and transmit a signal indicative of the dry matter density of the bale;

a weight sensor configured to sense data related to a total weight of the bale in the baling chamber and to transmit a signal indicative of the total weight of the bale;

a baler controller having a processor and a memory having a geometric dimension, a bale volume calculation algorithm, a dry bale weight calculation algorithm, and a bale moisture calculation algorithm stored thereon;

wherein the processor is configured to execute the bale volume calculation algorithm to:

receive the signal from the first input assembly; and calculate a volume of the bale based on the signal from the first input assembly and a geometric dimension of the baling chamber from the memory;

wherein the processor is configured to execute the dry bale weight calculation algorithm to:

receive the signal from the second input assembly;

calculate a dry matter density of the bale based on the signal from the second input assembly; and multiply the volume of the bale by the dry matter density of the bale to obtain a dry matter weight of the bale;

wherein the processor is configured to execute bale moisture calculation algorithm to:

receive the signal indicative of the total weight of the bale from the weight sensor;

calculate a moisture weight of the bale based on a numerical difference between the total weight of the bale and the dry matter weight of the bale; and communicate the moisture weight of the bale to a communicator.

2. The baler implement of claim 1, wherein the processor is operable to execute bale moisture calculation algorithm to calculate a quotient by dividing the moisture weight of the bale by the total weight of the bale to define a moisture percentage of the bale.

3. The baler implement of claim 1, wherein the first input assembly includes a bale size sensor configured to measure a variable dimension of the bale and transmit a signal indicative of the variable dimension of the bale, and the memory is configured to store a geometric dimension of the baling chamber; wherein the processor is operable to execute the bale volume calculation algorithm to receive the signal indicative of the variable dimension of the bale and a signal indicative of the geometric dimension of the baling chamber to calculate the volume of the bale.

4. The baler implement of claim 3, wherein at least one variable dimension includes one of a diameter of the bale, a radius of the bale, or a length of the bale.

5. The baler implement of claim 4, wherein the baler implement is a round baler, the geometric dimension of the chamber includes a width of the baling chamber, and the processor is operable to execute the bale volume calculation algorithm to calculate the volume of the bale by multiplying the width of the baling chamber by a circular end area of the bale, wherein the circular end area is equal to Pi multiplied by the square of the radius of the bale.

6. The baler implement of claim 4, wherein the baler implement is a square baler, the geometric dimension of the baling chamber includes a width and a height of the baling chamber, and the processor is operable to execute the bale volume calculation algorithm to calculate the volume of the bale including multiplying the width of the baling chamber by the height of the baling chamber by the length of the bale.

7. The baler implement of claim 1, wherein the second input assembly includes a force sensor configured to measure a force acting on the compressing member of the baler implement compressing the bale within the baling chamber, and wherein the dry matter density of the bale is derived based on a correlation between the force acting on the compressing member and dry matter density.

8. The baler implement of claim 7, wherein the implement baler is a round baler, the compressing member includes a tension cylinder, and wherein the force acting on the compressing member includes a fluid pressure force of the tension cylinder.

9. The baler implement of claim 7, wherein the baler implement is a square baler, the compressing member includes a plunger, and wherein the force acting on the compressing member includes a pressure force acting on a face of the plunger.

10. The baler implement of claim 1, wherein the processor is operable to execute the dry bale weight calculation algorithm to calibrate the calculation of the dry matter density of the bale based on at least one of a crop type, a crop length, a crop stem diameter, an ash content of crop, a bale shape, a rate of bale growth, a stem conditioning factor, a friction between the bale and the baling chamber, or a drive torque creating drive induced tension in a baler belt.

* * * * *